(12) United States Patent
Yen

(10) Patent No.: US 8,484,492 B2
(45) Date of Patent: Jul. 9, 2013

(54) ELECTRONIC DEVICE AND POWER CONTROL MODULE FOR CONTROLLING A STARTING PROCESS OF THE ELECTRONIC DEVICE UTILIZING A DELAY LATCH CIRCUIT AND AN INVERSE LOGIC UNIT

(75) Inventor: Hung-Wei Yen, Taipei (TW)

(73) Assignee: Pegatron Corporation, Taipei (TW)

( * ) Notice: Subject to any disclaimer, the term of this patent is extended or adjusted under 35 U.S.C. 154(b) by 408 days.

(21) Appl. No.: 12/911,800

(22) Filed: Oct. 26, 2010

(65) Prior Publication Data

US 2011/0113266 A1 May 12, 2011

(30) Foreign Application Priority Data

Nov. 9, 2009 (TW) .............................. 98137941 A

(51) Int. Cl.
*G06F 1/00* (2006.01)
*G06F 11/30* (2006.01)
(52) U.S. Cl.
USPC ............................ 713/300; 713/310; 713/340
(58) Field of Classification Search
USPC ........................................................ 713/300
See application file for complete search history.

(56) References Cited

U.S. PATENT DOCUMENTS 5,935,254 A * 8/1999 Lee ................................ 713/340
6,625,739 B1 * 9/2003 Kobayashi .................... 713/310
7,400,315 B2 * 7/2008 Lee ................................ 345/102
7,719,863 B2 * 5/2010 Yeh et al. ........................ 363/49
7,917,779 B2 * 3/2011 Xiong ............................ 713/300

FOREIGN PATENT DOCUMENTS

TW M346055 12/2008
TW 200928405 7/2009

OTHER PUBLICATIONS

English translation of abstract of TW M346055.
English translation of abstract of TW 200928405 (published Jul. 1, 2009).

* cited by examiner

*Primary Examiner* — Suresh Suryawanshi
(74) *Attorney, Agent, or Firm* — McClure, Qualey & Rodack, LLP

(57) ABSTRACT

This invention provides an electronic device and a power control module thereof. The electronic device is used for being connected with an external power source, and the electronic device includes a system unit, a power supply unit, a power control module, and a control unit coupled with the system unit and the power control module. When the power supply unit is connected with the external power source, the power supply unit provides a first operating voltage for the power control module, the power control module provides a first control signal for the control unit, and the control unit receives the first control signal and provides a second control signal for the power supply unit according to the first control signal, allowing the power supply unit to sequentially provide a plurality of system working voltages for the system unit.

9 Claims, 4 Drawing Sheets

(12) United States Patent
US 8,484,492 B2

ELECTRONIC DEVICE AND POWER CONTROL MODULE FOR CONTROLLING A STARTING PROCESS OF THE ELECTRONIC DEVICE UTILIZING A DELAY LATCH CIRCUIT AND AN INVERSE LOGIC UNIT

CROSS-REFERENCE TO RELATED APPLICATIONS

This Non-provisional application claims priority under 35 U.S.C. §119(a) on Patent Application No(s). 098137941 filed in Taiwan, Republic of China on Nov. 9, 2009, the entire contents of which are hereby incorporated by reference.

BACKGROUND OF THE INVENTION

1. Field of the Invention

This invention relates to an electronic device and, more particularly, to an electronic device and a power control module for controlling a starting process of the electronic device.

2. Description of the Related Art

With a tendency to automation and digitization, various kinds of computer systems have been already applied to individuals, families, and various kinds of industrial and commercial application fields. To achieve a market scale or to be convenient for interchangeable designs and later maintenance between different manufacturers, various kinds of the computer systems mostly follow a set of hardware design specifications during design development of hardware components.

For example, at present, in computer hardware, a specification of a common motherboard is an advanced technology extended (ATX) specification. In an electronic device conforming to the ATX specification, when the electronic device is connected with commercial power while it is not started, a low first operating voltage or a standby voltage (Vsb) is existed on the electronic device. At present, the common first operating voltage is about 3 to 5 V. A power button can be disposed at the electronic device. When a user operates (such as pressing) the power button, a control signal representing a system start is provided for an ATX power supply in the electronic device, and according to the control signal, the ATX power supply can sequentially provide various kinds of system working voltages needed by operation of various kinds of the electronic devices and can provide the system working voltages for each internal circuit module in the electronic device. The system working voltages can include various kinds of voltage levels, such as 0 V, 3 V, 5 V, and 12 V, needed by the electronic device.

However, according to different applications, hardware configurations of the electronic devices are different, and some electronic devices, such as an industrial machine, a game machine, or some automatic machines on production lines, do not have the power buttons. The electronic devices for industrial applications may not have the power buttons in themselves. After the electronic device is connected with an external power source, if no control signal representing the system start is provided by the power button for the ATX power supply, the electronic device cannot be started successfully.

BRIEF SUMMARY OF THE INVENTION

One objective of this invention is to provide an electronic device and a power control module thereof to improve the prior art.

According to one aspect of the invention, the invention provides an electronic device for being connected with an external power source. The electronic device includes a system unit, a power supply unit, a power control module, and a control unit.

The control unit is coupled with the system unit. The power control module is coupled with the control unit. The power supply unit is coupled with the system unit, the control unit, and the power control module. When the power supply unit is connected with the external power source, the power supply unit provides a first operating voltage for the power control module, the power control module provides a first control signal for the control unit, and the control unit receives the first control signal and provides a second control signal for the power supply unit according to the first control signal, allowing the power supply unit to sequentially provide a plurality of system working voltages for the control unit and the system unit. After a first predetermined time, the power supply unit provides a second operating voltage for the power control module. According to the first operating voltage and the second operating voltage, the power control module changes a voltage level of the first control signal, allowing the control unit to change a voltage level of the second control signal.

According to another aspect of the invention, the invention provides a power control module disposed at an electronic device. The electronic device includes a system unit and a power supply unit. The electronic device is used for being connected with an external power source. The power supply unit is coupled with the system unit and the power control module, respectively. The system unit is coupled with the power control module. When the power supply unit is connected with the external power source, the power supply unit provides a first operating voltage for the power control module, the power control module provides a first control signal for the control unit, and the control unit receives the first control signal and provides a second control signal for the power supply unit according to the first control signal, allowing the power supply unit to sequentially provide a plurality of system working voltages for the control unit and the system unit. After a first predetermined time, the power supply unit provides a second operating voltage for the power control module. According to the first operating voltage and the second operating voltage, the power control module changes a voltage level of the first control signal, allowing the system unit to change a voltage level of the second control signal.

Compared with the conventional electronic device, the electronic device and the power control module used in the electronic device in the invention can use a simple circuit to automatically provide a control signal needed by a system start when the power supply unit is connected with the external power source, thereby driving the power supply unit to provide the system working voltages thus to finish a starting process of the electronic device.

These and other features, aspects, and advantages of the present invention will become better understood with regard to the following description, appended claims, and accompanying drawings.

DETAILED DESCRIPTION OF THE INVENTION

Figure 1:
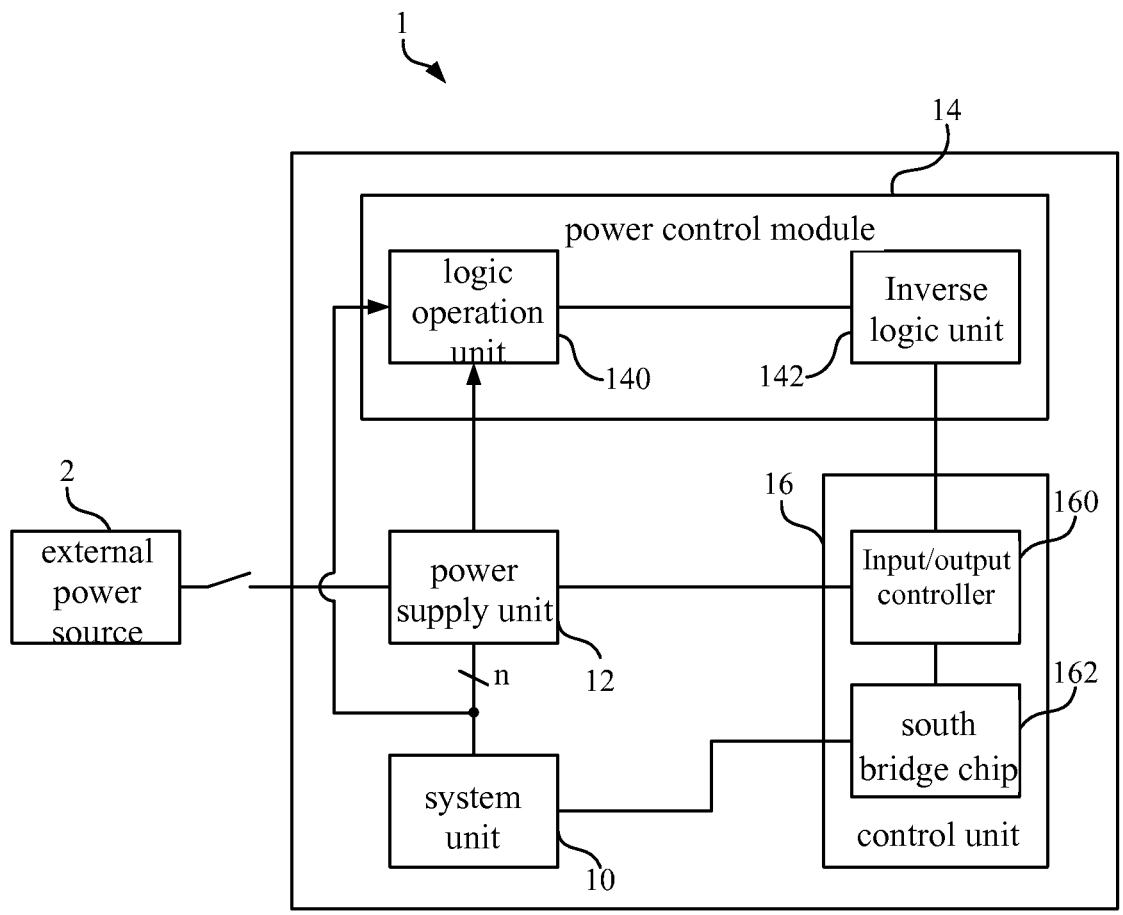
FIG. 1 is a functional block diagram showing an electronic device according to a first embodiment of the invention.

FIG. 1 is a functional block diagram showing an electronic device 1 according to a first embodiment of the invention. In the embodiment, the electronic device 1 includes a system unit 10, a power supply unit 12, a power control module 14, and a control unit 16. The power control module 14 includes an inverse logic unit 142 and a logic operation unit 140. The control unit 16 includes an input/output controller 160 and a south bridge chip 162.

The control unit 16 is coupled with the system unit 10. The power control module 14 is coupled with the control unit 16. The power supply unit 12 is coupled with the system unit 10, the control unit 16, and the power control module 14, respectively.

In the embodiment, the electronic device 1 is an industrial computer. In the embodiment, the system unit 10 refers to all electronic components and related devices except the control unit 16. For example, the system unit 10 may include a central processing unit, a north bridge chip, a memory unit, a hard disk, a communication module, a display, an optical disk drive and so on. In other embodiments, the control unit 16 may be included in the system unit 10.

In the embodiment, the power supply unit 12 is a power supply conforming to an advanced technology extended (ATX) specification. In FIG. 1, the power supply unit 12 can be connected with an external power source 2. For example, the power supply unit 12 may be directly inserted to an outlet of commercial power to obtain the external power source 2. In an embodiment, the ATX power supply (the power supply unit 12) may be responsible for converting power provided by the external power source 2 to proper voltage and current further to provide the voltage and current to the electronic device 1 and the system unit 10 and the control unit 16 therein.

In an embodiment, when the electronic device 1 is connected with the external power source 2 while it is not started, generally speaking, the ATX power supply may provide a low system standby voltage to the electronic device 1. When a user triggers a power button (conventionally, the user may press the power button), a start control signal may be provided for the ATX power supply. According to the start control signal, the ATX power supply may start to provide a proper system working voltage for the system unit 10 and the control unit 16 of the electronic device 1.

However, some electronic devices, such as an industrial computer system, do not have the power buttons and cannot be triggered to provide the control signal needed by the power supply unit. Even if the electronic device is connected with the external power source, the electronic device still cannot be successfully started to operate normally. In the embodiment, the electronic device 1 includes a power control module 14. The power control module 14 can cooperate with the power supply unit 12.

In the embodiment, when the power supply unit 12 is inserted to the outlet of the commercial power to be connected with the external power source 2, the power control module 14 provides a first control signal for the control unit 16, and the control unit 16 receives the first control signal and provides a second control signal for the power supply unit 12 according to the first control signal. The second control signal is used for triggering the power supply unit 12, allowing the power supply unit 12 to sequentially provide a plurality of system working voltages for the system unit 10 and the control unit 16. The power control module 14 can change a voltage level of the first control signal, allowing the control unit 16 to change a voltage level of the second control signal thus to start the electronic device 1.

In other words, as long as the power supply unit 12 is connected with the external power source 2, the power control module 14 can automatically provide the first control signal, and the first control signal indirectly triggers the power supply unit 12 via the control unit 16, such that the electronic device 1 can operate normally. However, the invention is not limited thereto. In another embodiment, the first control signal provided by the power control module 14 may directly trigger the power supply unit 12.

A process that the power control module 14 and the control unit 16 provide the control signal and trigger the power supply unit 12 is described hereinbelow in detail. In FIG. 1, in the embodiment, the power control module 14 includes a logic operation unit 140 and an inverse logic unit 142. In the embodiment, the logic operation unit 140 is an exclusive-or (XOR) unit. The logic operation unit 140 is coupled with the power supply unit 12. The inverse logic unit 142 is coupled between the logic operation unit 140 and the control unit 16.

When the power supply unit 12 is connected with the external power source 2, the power supply unit 12 provides a first operating voltage to the logic operation unit 140, and the logic operation unit 140 performs a logic operation to provide a starting signal. One input terminal of the logic operation unit 140 receives the first operating voltage, and another input terminal of the logic operation unit 140 receives a second operating voltage from the power supply unit 12. However, at that moment, the second operating voltage is still 0 V. After the starting signal is reversed via the inverse logic unit 142, the starting signal forms the first control signal and is transmitted to the control unit 16.

In FIG. 1, the control unit 16 includes an input/output controller 160 and a south bridge chip 162. The input/output controller 160 is coupled with the south bridge chip 162, the power control module 14, and the power supply unit 12, respectively. In other embodiments, the input/output controller 160 may be replaced with an embedded controller. However, the invention is not limited thereto.

When the power control module 14 provides the first control signal for the control unit 16, the control unit 16 provides the second control signal for the power supply unit 12 to trigger the power supply unit 12 to sequentially provide a plurality of system working voltages for the control unit 16 and the system unit 10 thus to finish a starting process.

In some embodiments, the first control signal is first transmitted to the input/output controller 160, and then the input/output controller 160 generates a signal to allow the south bridge chip 162 to output a signal to the input/output controller 160. The input/output controller 160 then generates the second control signal. In other embodiments, the first control signal may be directly transmitted to an embedded controller, and the embedded controller may generate the second control signal.

Figure 2:
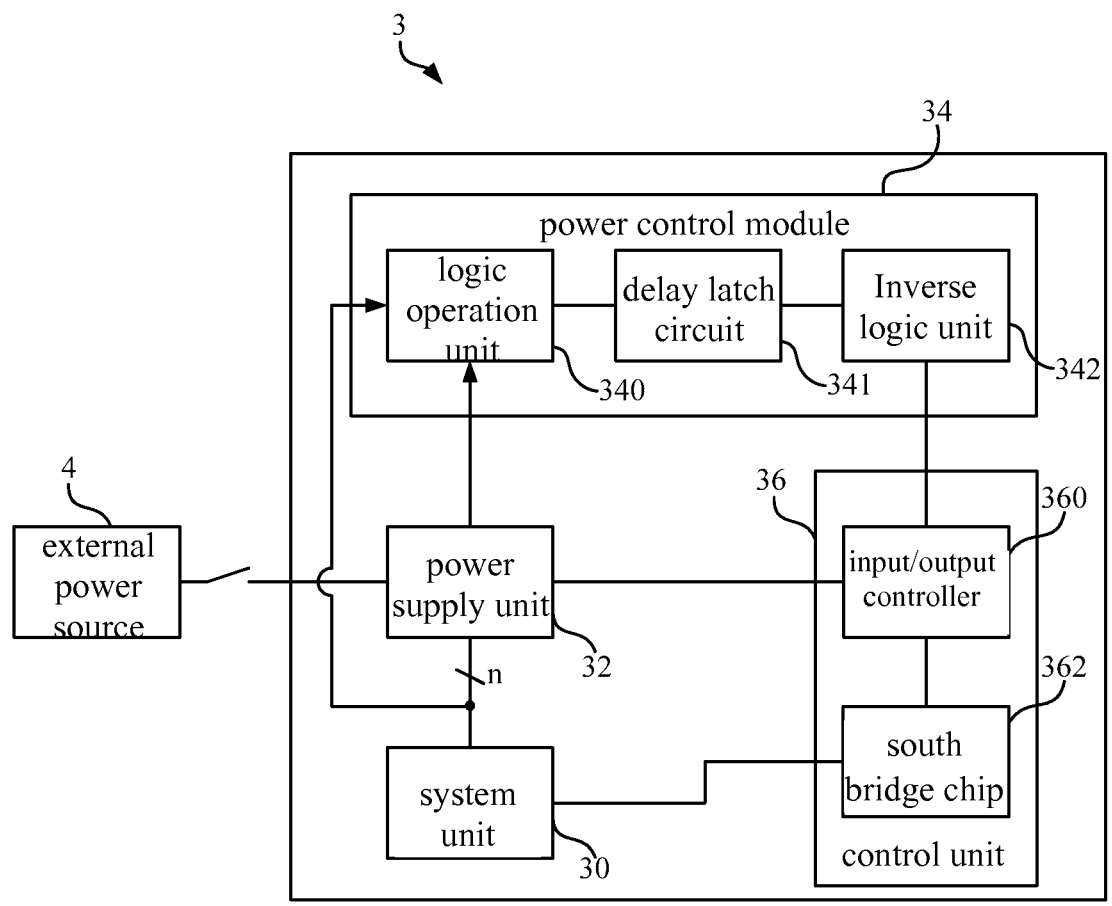
FIG. 2 is a functional block diagram showing an electronic device according to a second embodiment of the invention.

Please refer to FIG. 2. FIG. 2 is a functional block diagram showing an electronic device 3 according to a second embodiment of the invention. Compared with the first embodiment, a control unit 36 includes an input/output controller 360 and a south bridge chip 362, and additionally, a power control module 34 of the electronic device 3 in this embodiment further includes a delay latch circuit 341. The delay latch circuit 341 is coupled between a logic operation unit 340 and an inverse logic unit 342. When the power supply unit 32 is connected with an external power source 4 for a second predetermined time, the delay latch circuit 341 latches a voltage level of a first control signal provided by the inverse logic unit 342. In the embodiment, the second predetermined time can be equal to the first predetermined time, or the second predetermined time can be longer than the first predetermined time. However, the invention is not limited thereto.

Figure 3:
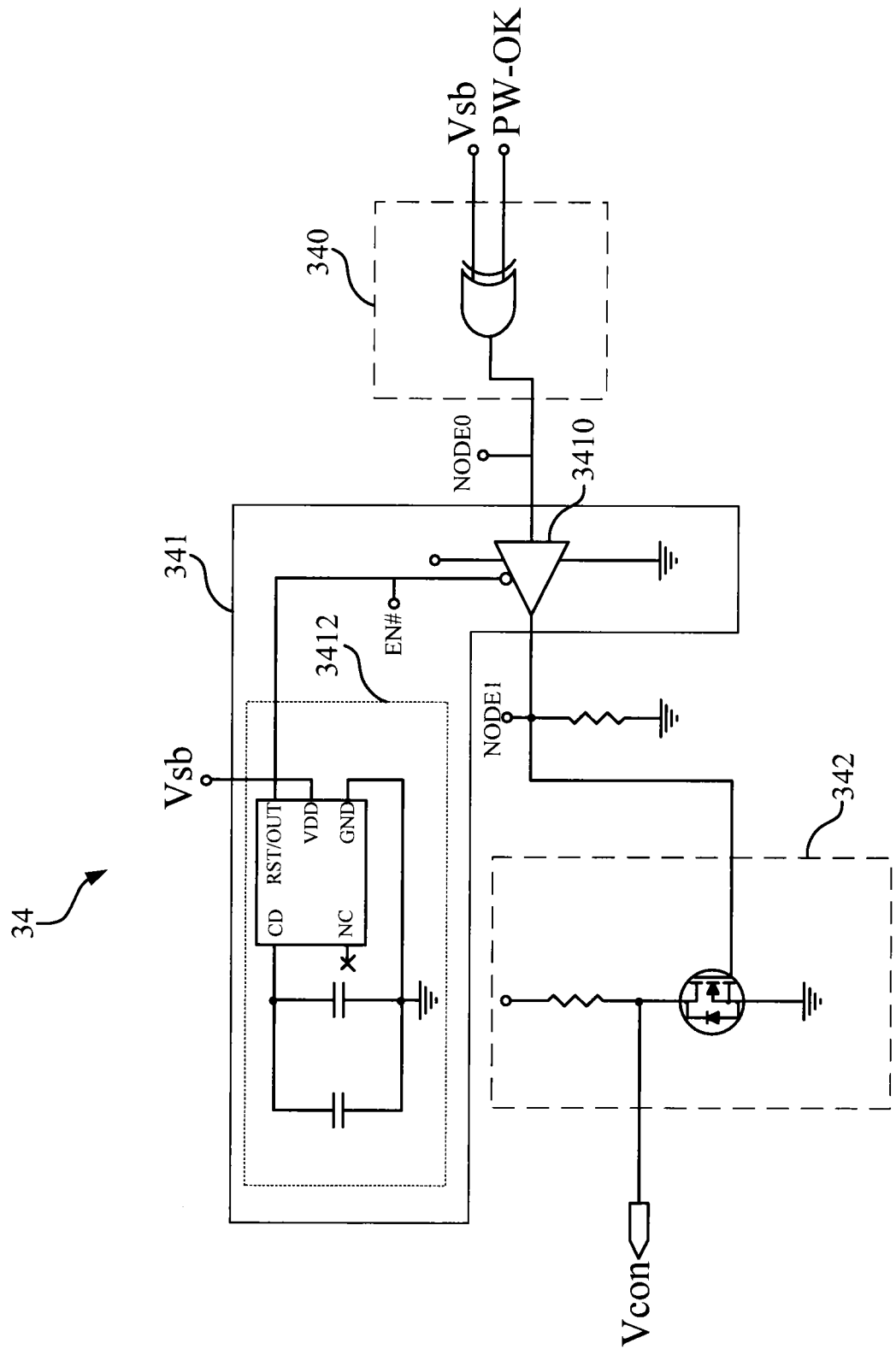
FIG. 3 is a schematic diagram showing a circuit of a power control module in FIG. 2.
Figure 4:
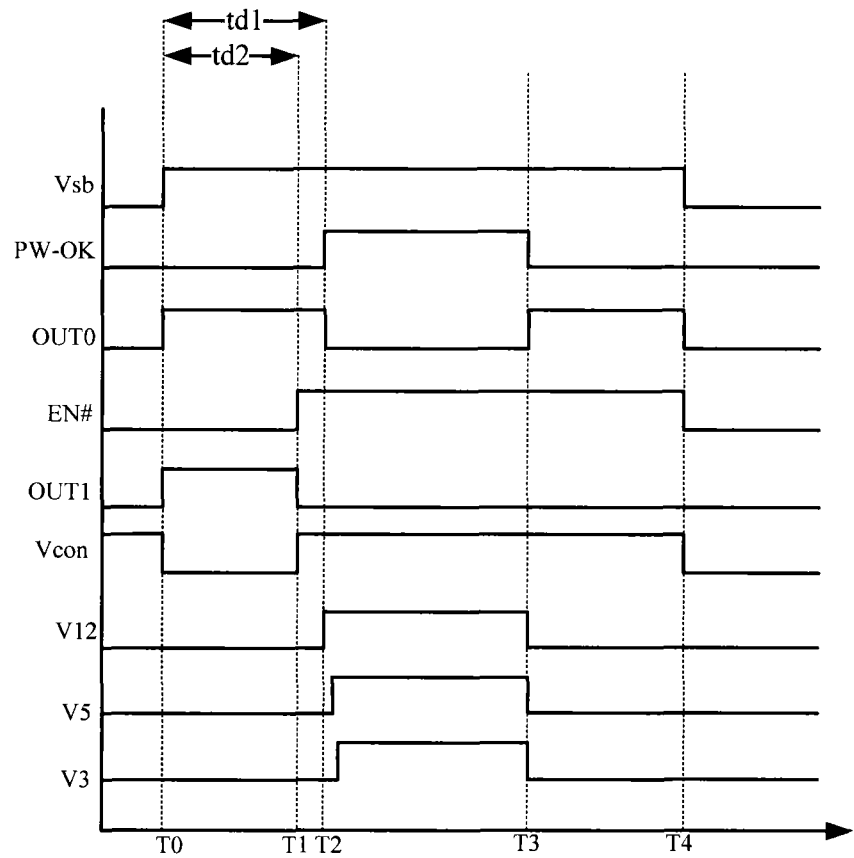
FIG. 4 is a schematic diagram showing time sequence of each node voltage of the power control module in FIG. 3 according to one operating embodiment.

Please refer to FIG. 3 and FIG. 4 together. FIG. 3 is a schematic diagram showing a circuit of the power control module 34 in FIG. 2. FIG. 4 is a schematic diagram showing time sequence of each node voltage of the power control module 34 in FIG. 3 according to one operating embodiment. In FIG. 3, the delay latch circuit 341 includes a latch 3410 and a delay component 3412. The latch 3410 is coupled between the logic operation unit 340 and the inverse logic unit 342. The delay component 3412 is coupled with the power supply unit 32.

In FIG. 4, in the above operating embodiment, at a time point T0, a user connects the power supply unit 32 with the external power source 4. Thus, the power supply unit 32 starts to provide a first operating voltage Vsb for the power control module 34.

The two input terminals of the logic operation unit 340 are coupled with the power supply unit 32, respectively. One input terminal receives the first operating voltage Vsb, and the other input terminal receives a second operating voltage (the voltage can be called PW-OK). In the operating embodiment, after the power supply unit 32 provides a plurality of system working voltages, the power supply unit 32 can provide the second operating voltage (PW-OK) for the logic operation unit 340.

The logic operation unit 340 performs an XOR operation with the first operating voltage Vsb and the second operating voltage PW-OK. At that moment, due to power supplied by the power supply unit 32, the first operating voltage Vsb is at a high level (logic 1), and the second operating voltage PW-OK is at a low level (logic 0) as the electronic device 3 is not started. Thereby, the logic operation unit 340 provides a starting signal (In FIG. 4, a voltage level of a terminal NODE0 is a high level).

At that moment, the latch 3410 in the delay latch circuit 341 is enabled. The starting signal (NODE0, high level) is inputted to an input terminal (NODE1, high level) of the inverse logic unit 342, and after the inverse logic unit 342 reverses the starting signal, the inverse logic unit 342 provides a first control signal Vcon (low level). In the embodiment, the first control signal Vcon is processed by the control unit 36 to indirectly trigger the power supply unit 32 for performing a starting process, and the power supply unit 32 sequentially provides different system working voltages at different voltage levels for the control unit 36 and the system unit 30 of the electronic device 3. In FIG. 4, the power supply unit 32 can sequentially provide the system working voltages (V12, V5, V3), such as 12 V, 5 V, 3 V and so on, according to an actual power specification of the electronic device. However, the invention is not limited thereto.

In FIG. 4, after the first control signal Vcon is switched to the low level, the first control signal Vcon is processed by the control unit 36 to trigger the power supply unit 32. In an embodiment, the process may need a period of time. In the embodiment, after a first predetermined time td1 starting from the time point T0 to a time point T2, the power supply unit 32 starts to provide various kinds of the system working voltages (V12, V5, V3) at different levels and to drive the electronic device 3 to operate normally. At the same time, when the power supply unit 32 is at the time point T2, the power supply unit 32 starts to provide the second operating voltage PW-OK for the power control module 34. In the embodiment, the second operating voltage PW-OK represents that the electronic device 3 is powered on.

At that moment, both the two input terminals (the first operating voltage Vsb and the second operating voltage PW-OK) of the logic operation unit 340 are at the high level. Thus, the starting signal (NODE0) outputted by the logic operation unit 340 is switched to the low level.

On the other hand, starting from the time point T0, the power supply unit 32 starts to charge a capacitor in the delay component 3412. After the power supply unit 32 is connected with the external power source 4 for a second predetermined time td2, i.e., a time point T1 is achieved, a node voltage of the capacitor in the delay component 3412 is greater than a reference value. Thereby, a latch signal EN# is provided to disable the latch 3410, thus to shield connection relation between the logic operation unit 340 and the inverse logic unit 342. In the embodiment, after the time point T1, the input terminal (NODE1) of the inverse logic unit 342 is no more coupled with the logic operation unit 340, and the input terminal (NODE1) is lowered by the capacitor to be fixed at the low level. Thereby, the voltage level of the first control signal is latched at the high level. The length of the predetermined time td is related to a capacitance value of the capacitor in the delay component 3412.

Afterwards, at a time point T3, supposing that the user switches the electronic device 3 to a soft off state or a standby state in a software mode, at that moment, the power supply unit 32 may stop providing the second operating voltage PW-OK. That is, at that moment, the second operating voltage PW-OK is returned to the low level (logic 0). At that moment, the first operating voltage Vsb is still kept at the high level (logic 1), and the starting signal (NODE0) outputted by the logic operation unit 340 is raised to the high level.

The delay latch circuit 341 (the latch 3410 and the delay component 3412) shields the connection relation between the logic operation unit 340 and the inverse logic unit 342, such that a voltage level of the output terminal NODE0 of the logic operation unit 340 cannot affect a voltage level of the input terminal NODE1 of the inverse logic unit 342. Thus, the electronic device 3 can be in the standby state instead of being triggered mistakenly and started again.

After a time point T4 in FIG. 4, the user removes the connection relation between the power supply unit 32 and the external power source 4, such as unplugging a power plug connecting the electronic device 3 and the outlet of the commercial power or turning off a switch of the power outlet, thus to cut off the power supply of the electronic device 3.

To sum up, according to the preferred embodiments of the invention, the electronic device and the power control module thereof use the simple circuit to automatically provide the control signal needed by the system start when the power supply unit is connected with the external power source, thereby driving the power supply unit to provide the system working voltages thus to finish the starting process of the electronic device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device for being connected with an external power source, the electronic device comprising:
   a system unit;

a control unit coupled with the system unit;
a power control module coupled with the control unit; and
a power supply unit coupled with the system unit, the control unit, and the power control module,
wherein when the power supply unit is connected with the external power source, the power supply unit provides a first operating voltage for the power control module, the power control module provides a first control signal for the control unit, and the control unit receives the first control signal and provides a second control signal for the power supply unit according to the first control signal, allowing the power supply unit to sequentially provide a plurality of system working voltages for the control unit and the system unit, after a first predetermined time, the power supply unit provides a second operating voltage for the power control module, and according to the first operating voltage and the second operating voltage, the power control module changes a voltage level of the first control signal, allowing the control unit to change a voltage level of the second control signal; and
wherein the power control module further comprises a delay latch circuit, and after the power supply unit is connected with the external power source for a second predetermined time, the delay latch circuit latches the voltage level of the first control signal provided by an inverse logic unit.

2. The electronic device according to claim 1, wherein the power supply unit is a power supply conforming to an advanced technology extended (ATX) specification.

3. The electronic device according to claim 1, wherein the control unit comprises:
a south bridge chip; and
an input/output controller coupled with the south bridge chip, the power control module, and the power supply unit, respectively.

4. The electronic device according to claim 1, wherein the power control module comprises:
a logic operation unit coupled with the power supply unit; and
the inverse logic unit coupled with the logic operation unit and the control unit, respectively;
wherein when the power supply unit is connected with the external power source, the logic operation unit performs a logic operation for the first operating voltage to provide a starting signal, and after the starting signal is reversed by the inverse logic unit, the starting signal forms the first control signal.

5. The electronic device according to claim 4, wherein after the first predetermined time, the logic operation unit performs a logic operation for the first operating voltage and the second operating voltage to change a voltage level of the starting signal further to change the voltage level of the first control signal.

6. The electronic device according to claim 1, wherein the delay latch circuit comprises a latch and a delay component, the latch is coupled between the logic operation unit and the inverse logic unit, the delay component is coupled with the power supply unit, and after the power supply unit is connected with the external power source for the second predetermined time, the delay component controls the latch to shield connecting relation between the logic operation unit and the inverse logic unit, thereby latching the voltage level of the first control signal.

7. A power control module disposed at an electronic device, the electronic device including a system unit and a power supply unit, the electronic device for being connected with an external power source, the power supply unit coupled with the system unit and the power control module, respectively, the system unit coupled with the power control module, when the power supply unit is connected with the external power source, the power supply unit providing a first operating voltage for the power control module, the power control module providing a first control signal for the system unit, the system unit receiving the first control signal and providing a second control signal for the power supply unit according to the first control signal, allowing the power supply unit to sequentially provide a plurality of system working voltages for the system unit, after a first predetermined time, the power supply unit providing a second operating voltage for the power control module, according to the first operating voltage and the second operating voltage, the power control module changing a voltage level of the first control signal, allowing the system unit to change a voltage level of the second control signal, wherein the power control module further comprises a delay latch circuit, and after the power supply unit is connected with the external power source for a second predetermined time, the delay latch circuit latches the voltage level of the first control signal provided by the inverse logic unit.

8. The power control module according to claim 7, wherein the power control module comprises:
a logic operation unit coupled with the power supply unit; and
an inverse logic unit coupled with the logic operation unit and the system unit, respectively;
wherein when the power supply unit is connected with the external power source, the logic operation unit performs a logic operation for the first operating voltage to provide a starting signal, and after the starting signal is reversed by the inverse logic unit, the starting signal forms the first control signal.

9. The power control module according to claim 8, wherein after the first predetermined time, the logic operation unit performs a logic operation for the first operating voltage and the second operating voltage to change a voltage level of the starting signal further to change the voltage level of the first control signal.

* * * * *